United States Patent [19]
Inoue

[11] 4,409,933
[45] Oct. 18, 1983

[54] ENGINE COMPARTMENT COOLING APPARATUS

[75] Inventor: Hiroshi Inoue, Yokohama, Japan

[73] Assignee: Nissan Motor Company, Limited, Kanagawa, Japan

[21] Appl. No.: 398,658

[22] Filed: Jul. 15, 1982

[30] Foreign Application Priority Data

Aug. 12, 1981 [JP] Japan .............................. 56-118701[U]

[51] Int. Cl.³ ............................................. F01P 7/12
[52] U.S. Cl. ............................. 123/41.12; 123/41.49; 318/471
[58] Field of Search ............... 123/41.12, 41.49, 41.57, 123/41.58; 180/54 A; 318/471, 473; 307/117

[56] References Cited

U.S. PATENT DOCUMENTS

| | | | |
|---|---|---|---|
| 3,964,444 | 6/1976 | Hemmann et al. | 123/41.49 |
| 4,168,456 | 9/1979 | Isobe | 123/41.12 |
| 4,313,402 | 2/1982 | Lehnhoff et al. | 123/41.49 |
| 4,327,674 | 5/1982 | Takei | 123/41.49 |

FOREIGN PATENT DOCUMENTS 53-139033  5/1978  Japan .............................. 123/41.58

Primary Examiner—William A. Cuchlinski, Jr.
Attorney, Agent, or Firm—Lowe, King, Price & Becker

[57] ABSTRACT

When the temperatures of engine coolant and outside-air are above respective predetermined values immediately after the engine has stopped, a fan to cool the engine is operated for a predetermined time interval, thereby preventing engine compartment from being heated excessively.

6 Claims, 3 Drawing Figures

ENGINE COMPARTMENT COOLING APPARATUS

BACKGROUND OF THE INVENTION

The present invention relates to a vehicle engine, and more particularly to an apparatus for cooling the engine compartment to protect various parts mounted therein from high heat.

Conventionally, an engine compartment cooling apparatus has been proposed which activates a fan to cool the engine when the temperature of the coolant for the engine rises above a predetermined value. In this circuit, voltage is supplied to an ignition line from a battery when an ignition switch is on. During engine operation, the temperature of engine coolant can increase to a predetermined value in which case a thermal-responsive switch is closed so that current flows from the battery through the ignition switch, the coil of a relay and the thermal-responsive switch to ground. This closes the contacts of the relay. As a result, current flows from the battery through the contacts and a fan motor to ground, thereby rotating the motor to cool the coolant and thus the engine compartment. During engine operation, the fan motor is controlled in an on-off manner by the thermal-responsive switch. In this apparatus, however, the fan motor is operated solely during engine operation so that the temperature of the engine compartment can temporarily exceed safe levels when the key switch is switched off immediately after high-speed travel, or high-load travel such as travelling up a slope or in hot summer. This is undesirable for parts such as those of relatively small thermal capacity or electronic parts susceptible to the influence of heat.

SUMMARY OF THE INVENTION

It is an object of the present invention to provide an engine compartment cooling apparatus which prevents a high-temperature state of the engine compartment which might otherwise occur temporarily immediately after the key switch is turned off.

According to the present invention, when the temperatures of engine coolant and outside air are above respective predetermined values immediately after the engine has stopped, a fan is operated for a predetermined time interval to cool the engine.

Other features and advantages of the present invention will be apparent from the following description of a preferred embodiment thereof, taken in conjunction with the accompanying drawings.

BRIEF DESCRIPTION OF THE DRAWINGS

Like reference numerals designate similar parts throughout the drawings in which.

DETAILED DESCRIPTION OF THE PREFERRED EMBODIMENT

Figure 1:
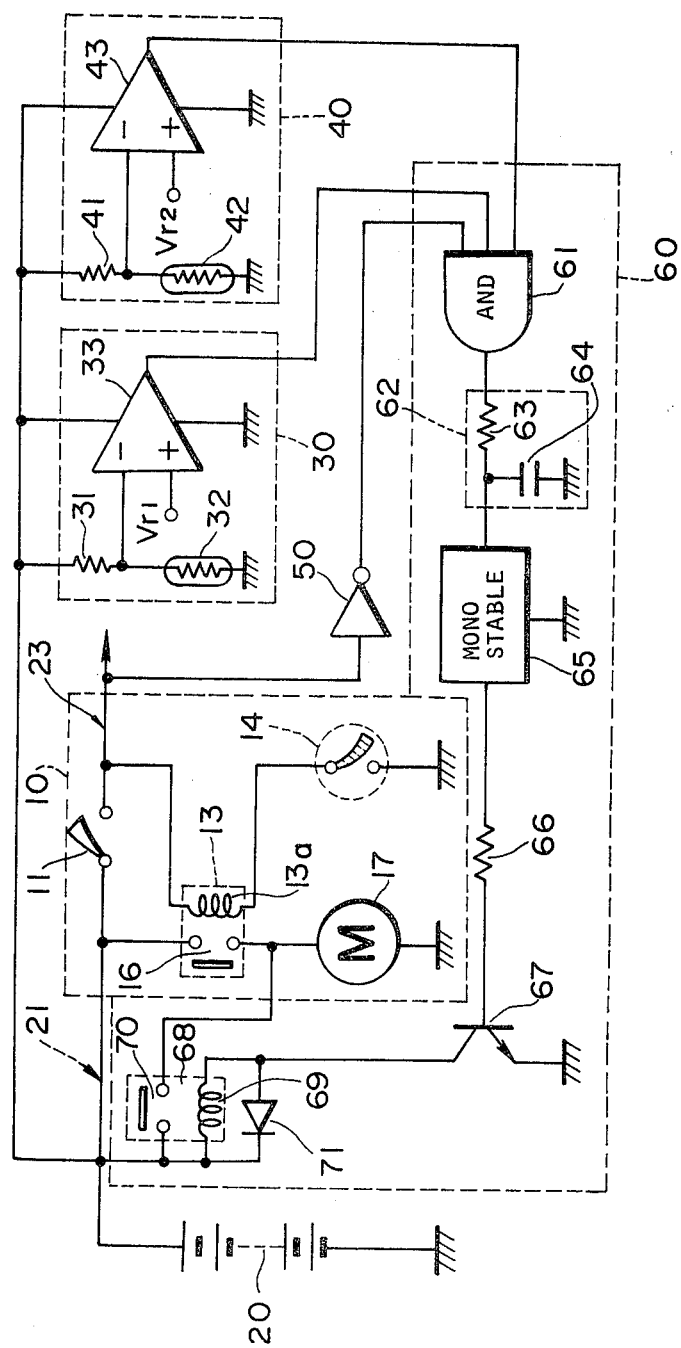
FIG. 1 is a schematic circuit diagram of a preferred embodiment of an engine compartment cooling apparatus according to the present invention.

FIG. 1 shows a preferred embodiment of an engine compartment cooling apparatus according to the present invention. The apparatus includes an electric radiator-cooling fan circuit 10 of a front-engined front-wheel-drive vehicle connected to a battery 20. The fan circuit includes an ignition switch 11 connected via a battery line 21 to the battery 20, a relay 13, and a thermal-responsive switch 14 connected through the relay coil 13a, and an ignition line 23. It also includes the relay contacts 16 and an electric fan motor 17 connected through the normally-open relay contact 16 to battery line 21.

The apparatus includes an engine coolant temperature sensor 30 which in turn includes a resistor 31 and a thermistor 32 connected in series to battery 20, and a comparator 33, the inverting input of which is connected to the junction between the resistor 31 and the thermistor 32. The non-inverting input of the comparator 33 is connected to a predetermined reference voltage Vr1. The thermistor 32 is disposed in the engine coolant and changes in resistance depending on the temperature of the engine coolant, as is well known. As the temperature of the engine coolant rises, the resistance of thermistor 32 decreases so that the voltage at the inverting input of the comparator 33 will eventually decrease below the reference level Vr1. This switches the output of comparator 33 from low to high level, which indicates that the temperature of engine coolant has exceeded a predetermined value.

The apparatus includes an outside-air temperature sensor 40 which includes a resistor 41 and a thermistor 42 connected in series to the battery 20. Sensor 40 also inclues a comparator 43, the inverting input of which is connected to the junction between the resistor 41 and thermistor 42. The non-inverting input of the comparator 43 is connected to a predetermined reference voltage Vr2. The thermistor 42 is disposed on the vehicle in such a way that it is exposed to air which at least approximates atmospheric temperature. As the atmospheric temperature rises, the resistance of the thermistor 42 decreases so that the voltage level at the inverting input of the comparator 43 can drop below the reference level Vr2 of the comparator. At that time, the output of comparator 43 switches from low to high level. This indicates that the atmospheric temperature has exceeded a predetermined value.

Figure 2:
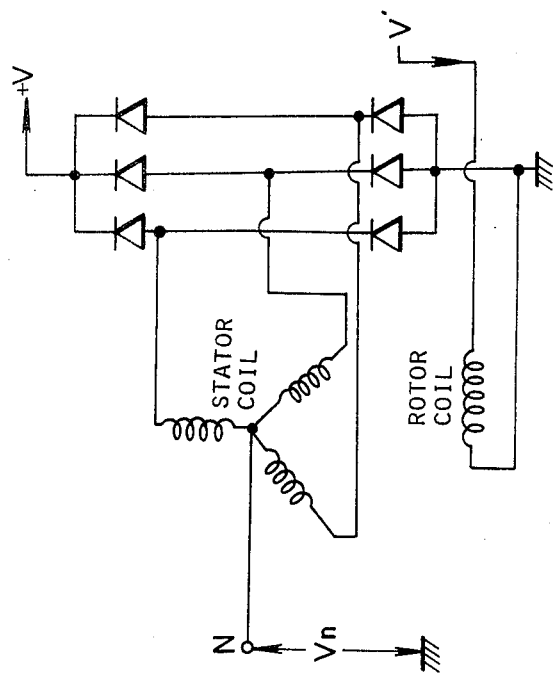
FIG. 2 is a schematic circuit diagram of an alternator.

The apparatus includes an engine stop sensor which may be an inverter 50 connected to the ignition line 23. When the ignition switch 11 is opened so that the ignition line 23 is grounded, the inverter 50 produces a high output. Alternatively, the engine stop sensor may sense the voltage level Vn of the neutral point N of a well-known battery-charging alternator with respect to ground, as shown in FIG. 2. Also, alternatively, it may sense the presence of a spark signal in the ignition system of the engine.

The apparatus includes a fan motor driving circuit 60 which in turn includes an AND gate 61 receiving the outputs of engine coolant temperature sensor 30, outside-air temperature sensor 40 and engine stop sensor 50. The output of the AND gate 61 passes through a low-pass filter 62 composed of a resistor 63 and a capacitor 64, and a monostable multivibrator 65 responsive to the output of the filter 62 to produce a constant output for a predetermined time interval. The circuit 60 further includes a transistor 67, the base of which is connected through a resistor 66 to the output of the monostable multivibrator 65, a relay 68 which includes an energizing coil 69 and a normally-closed contact 70, and a diode 71 connected in parallel with coil 69 for absorbing a possible flyback voltage. Coil 69 is connected between battery line 21 and the collector of transistor 67, the emitter of which is grounded. Contact 70, when closed, connects battery line 21 directly to motor 17. When the transistor 67 is turned on, coil 69 is energized by the battery 20, thereby closing contact 70 to supply power to motor 17.

The operation of the embodiment will be described:
(1) During engine operation:

Even if engine coolant temperatrure sensor 30 and outside air temperature sensor 40 both sense respective temperatures which are higer than predetermined values and send high signals to AND gate 61, the output of inverter 50 remains low. Thus, the output of AND gate 61 remains low so that multivibrator 65 is not triggered and relay 68 is not energized, thereby keeping contact 70 open. Accordingly, fan motor 17 is controlled solely in accordance with the thermal-responsive switch 14 as in the conventional system.

(2) When engine stops:

(A) when the temperature of outside-air or engine coolant is below predetermined value:

The circuit involving relay 13 and thermal-responsive switch 14 are not supplied with power through ignition line 23 when ignition switch 11 is off. Thus fan motor 17 is not activated via this circuit even if thermal switch 14 is closed.

Since either one of the temperatures of outside-air and engine coolant is below the predetermined value, the output of the corresponding comparator 33 and/or 43 is at low level. Thus the output of AND gate 61 remains low so that relay 68 is not energized as is the case during engine operation. Consequently, fan motor 17 is not driven because it is not supplied with power from either circuit.

(B) When the temperatures of outside-air and engine coolant both exceed the predetermined values:

Fan motor 17 is not driven by switch 14, as in the case of (A).

On the other hand, the respective outputs of comparators 33 and 43 go high and the output of inverter 50 goes high as soon as the ignition switch 11 is switched off so that the output of AND gate 61 goes high. This triggers multivibrator 65 to produce a high output for a predetermined time interval after the engine stops, thereby triggering transistor 67. This energizes relay 68, closing its contact 70 so that power is supplied through contact 70 to fan motor 17, thereby driving fan motor 17 for the predetermined time interval after the engine stops.

As described above, the fan driven by fan motor 17 serves as a radiator cooling fan during engine operation as in a conventional fan, and when engine is stopped and the temperatures of both engine coolant and outside-air are high, it acts as an engine compartment cooling fan for a predetermined time interval after the engine is stopped. The predetermined time interval is determined by the operating time interval of multivibrator 65. Since the transitional high-temperature state of the engine compartment when key switch 11 is switched off continues for at most one minute, the operating time interval of the multivibrator 65 should be chosen to be somewhat longer than one minute. Low pass filter 64 prevents inadvertent operation of multivibrator 65 due to electrical noise.

Figure 3:
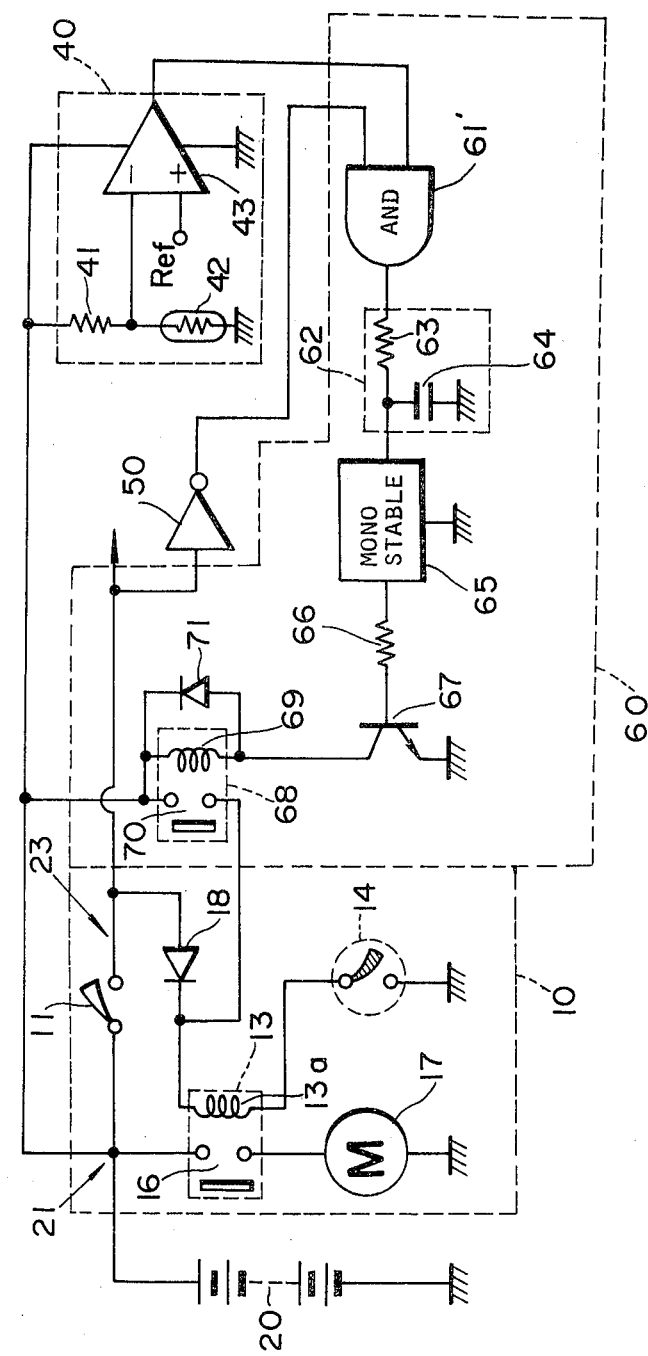
FIG. 3 is a view similar to FIG. 1 of a modification of the present invention.

FIG. 3 shows a modification of the present invention. The modification is basically the same as the embodiment of FIG. 1 except that engine coolant temperature sensor 30 is replaced by the conventional thermal-responsive switch 14. That is, only the outputs of outside-air temperature sensor 40 and inverter 50, which senses whether or not ignition switch 11 is off, are inputted to AND gate 61', the output of which is applied through low-pass filter 64 to monostable multivibrator 65. When the engine is turned off, fan motor 17 is operated solely when thermal-responsive switch 14 and contact 70 are both closed. Relay contact 70 is disposed between battery line 21 and one terminal of relay coil 13 and the other terminal of relay coil 13 is grounded through thermal-responsive switch 14. A diode 18 disposed between ignition line 23 and relay coil 13 prevents supply of power to ignition line 23 via contact 70 to inverter 50 when ignition switch 11 is off and when relay 68 is energized to close its contact 70.

In the device of FIG. 3, the voltage level Vn of the neutral point N of the alternator shown in FIG. 2 may also be used as the engine stop sensor. Also, alternatively a spark signal from the ignition system of the engine may be used.

The engine coolant sensor conventionally used to monitor the temperature of engine coolant may be used in place of thermistor 32.

If a vehicle is provided with an electronic fuel injection device, an intake air temperature sensor usually provided in the vehicle may be used as thermistor 42 which senses the temperature of outside-air.

While the present invention has been described and shown in terms of a preferred embodiment and a modification thereof, the present invention is not limited to the embodiment. Various other modifications and changes could be made by those skilled in the art without departing from the spirit and scope of the present invention as set forth in the affixed claims.

What is claimed is:

1. Apparatus for cooling an engine compartment of a vehicle, comprising:
   (a) first detecting means for sensing the cessation of engine operation to produce a stop signal;
   (b) second detecting means for sensing the temperature of engine coolant to produce a coolant signal when the temperature of the coolant is above a predetermined value;
   (c) third detecting means for sensing the temperature of outside air to produce an outside-air signal when the temperature of the outside air is above a predetermined value;
   (d) means for driving a fan for cooling the engine; and
   (e) means responsive to the stop signal, coolant signal and outside-air signal for actuating said driving means for a predetermined time interval.

2. Apparatus as set forth in claim 1, wherein said first detecting means senses the absense of ignition voltage.

3. Apparatus as set forth in claim 1, wherein said actuating means includes an AND gate responsive to the presence of the stop signal, coolant signal and outside-air signal to produce a triggering signal, a monostable multivibrator responsive to said triggering signal for producing a second triggering signal for a predetermined time interval, switching means responsive to the second triggering signal for connecting electric drive power to said driving means.

4. Apparatus as set forth in claim 1, wherein said actuating means includes an AND gate resposive to the outside-air signal and the stop signal to produce a triggering signal, a monostable multivibrator resposive to the triggering signal to produce a second triggering signal for said predetermined time interval, a thermal-responsive switch responsive to the temperature of the coolant when the temperature of the coolant is above the predetermined value to produce a switching signal, and means responsive to the triggering signal and the switching signal for closing a circuit through which electric drive power is supplied to said driving means.

5. Apparatus as set forth in claim 1, wherein said first detecting means senses the absence of voltage at a neutral point of the alternator for charging the vehicle battery.

6. Apparatus as set forth in claim 3 or 4, further including means disposed between said AND gate and said monostable multivibrator for eliminating possible electric noises.

* * * * *